(12) United States Patent
Van Den Bogert

(10) Patent No.: US 9,510,715 B2
(45) Date of Patent: Dec. 6, 2016

(54) ROBOTIC VACUUM CLEANING

(75) Inventor: Willem Frederik Van Den Bogert, Hoogeveen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2363 days.

(21) Appl. No.: 12/278,976

(22) PCT Filed: Jan. 31, 2007

(86) PCT No.: PCT/IB2007/050324
§ 371 (c)(1),
(2), (4) Date: Aug. 11, 2008

(87) PCT Pub. No.: WO2007/093926
PCT Pub. Date: Aug. 23, 2007

(65) Prior Publication Data
US 2009/0133720 A1 May 28, 2009

(30) Foreign Application Priority Data

Feb. 13, 2006 (EP) .................................... 06101598

(51) Int. Cl.
*A47L 5/36* (2006.01)
*A47L 9/04* (2006.01)
*G05D 1/02* (2006.01)

(52) U.S. Cl.
CPC .................. *A47L 5/362* (2013.01); *A47L 9/04* (2013.01); *G05D 1/0246* (2013.01); *G05D 1/0274* (2013.01); *A47L 2201/04* (2013.01); *G05D 1/024* (2013.01); *G05D 1/0225* (2013.01); *G05D 1/0242* (2013.01); *G05D 1/0255* (2013.01); *G05D 1/0257* (2013.01); *G05D 2201/0215* (2013.01)

(58) Field of Classification Search
CPC ........ A47L 5/362; A47L 9/04; A47L 2201/04; G05D 1/0225; G05D 1/024; G05D 1/0242; G05D 1/0246; G05D 1/0255; G05D 1/0257; G05D 1/0274; G05D 2201/0215
USPC ........................ 15/319, 339, 340.1, 355, 368
See application file for complete search history.

(56) References Cited

U.S. PATENT DOCUMENTS

| | | | |
|---|---|---|---|
| 5,621,291 A * | 4/1997 | Lee | 318/568.16 |
| 6,532,404 B2 | 3/2003 | Colens | |
| 6,883,201 B2 | 4/2005 | Jones et al. | |
| 7,930,797 B2 * | 4/2011 | Yoo | 15/319 |
| 2004/0204792 A1 * | 10/2004 | Taylor et al. | 700/245 |
| 2005/0010331 A1 | 1/2005 | Taylor et al. | |
| 2005/0166354 A1 | 8/2005 | Uehigashi | |
| 2005/0278888 A1 * | 12/2005 | Reindle et al. | 15/319 |

FOREIGN PATENT DOCUMENTS

| | | |
|---|---|---|
| DE | 10346216 B3 | 9/2004 |
| GB | 2273865 A | 7/1994 |

(Continued)

*Primary Examiner* — Robert Scruggs

(57) ABSTRACT

A robotic vacuum cleaner including a control system and a suction nozzle with a cleaning brush. The control system controls at least one of frequency and intensity of contact between the cleaning brush and each brushable portion of a floor surface to be cleaned such that at least one of the frequency and the intensity of contact between the cleaning brush and the floor surface decreases with a decrease of the distance to the at least one boundary of the floor surface.

12 Claims, 3 Drawing Sheets

(56) References Cited

FOREIGN PATENT DOCUMENTS

| | | | |
|---|---|---|---|
| JP | 06327594 | A | 11/1994 |
| JP | 08275913 | A1 | 10/1996 |
| JP | 09098916 | A | 4/1997 |
| JP | 2003290101 | A | 10/2003 |
| JP | 2005148889 | A | 6/2005 |
| WO | 0106904 | A1 | 2/2001 |
| WO | 02074150 | A1 | 9/2002 |

* cited by examiner

ROBOTIC VACUUM CLEANING

The invention relates to a robotic vacuum cleaner and to a method for automatically vacuum cleaning a floor surface. Such a vacuum cleaner and such a method are for instance known from International patent application WO 02/074150. The suction nozzle is equipped with a rotating cleaning brush. In robotic vacuum cleaners the use of brush nozzles in combination with suction is of particular advantage, because it enables a thorough dust pick-up at a low power usage per square meter.

However, the use of brushes does entail wear of the floor surface in particular if the floor surface is a carpet surface, which causes the visual attractiveness of the floor cover to wear out quicker than normal wear only.

It is an object of the invention to at least reduce the negative influence of robot vacuum cleaning on the durability of the visual attractiveness of a floor cover, and in particular of a carpet.

In order to achieve this goal, the invention provides a robotic vacuum cleaner and a method of automatically vacuum cleaning a carpet.

By reducing the frequency and the intensity of brushing with the distance to a boundary of the floor surface to be vacuum cleaned, the negative impact on the visual appearance due to brushing is reduced particularly effectively and with a minimal negative influence on the thoroughness of dirt removal.

Firstly, areas of the floor cover closely along the boundaries tend to wear very little by normal wear. Therefore, wear due to the systematic robot vacuum cleaning represents virtually the only cause of wear in these areas, making the robot vacuum cleaning induced wear relatively conspicuous in these areas. Moreover, dirt tends to adhere less to portions of the floor surface closely along the boundaries than to more heavily walked central portions of floor surfaces, so there is generally less need for brushing closely along the boundaries of the floor surface.

Secondly, depending on the suction nozzle and vacuum cleaner design, smaller or larger non-brushed floor surface portions are left along the boundaries of the vacuum cleanable floor surface. This is typically caused by the presence of obstacles closely above the floor such as furniture or radiators, by irregular shapes of the boundaries and/or by the design of the vacuum cleaner. Even when using an automotive suction nozzle connected to the remainder of the autonomous vacuum cleaner via a flexible hose, as is for example disclosed in the International patent application WO 02/074150, which suction nozzle can be of a relatively small size and is therefore capable of passing under most objects, the armature needed for holding the brush prevents the brush from brushing the floor surface up to the contour of the footprint of the suction nozzle, leaving an unbrushed zone along a boundary of the vacuum cleanable floor surface, where the floor surface is bounded by an object projecting upwardly from the floor, such as a skirting-board. The difference in carpet wear at the demarcation line between the brushed and the non-brushed portions along the boundaries of the floor surface causes the robot vacuum cleaning induced wear to be particularly conspicuous in these areas as well.

Thus, by selectively decreasing the brushing intensity and/or frequency for floor portions closely along at least one boundary of the floor surface to be vacuum cleaned, robot vacuum cleaning caused wear is reduced where it is most conspicuous and where the reduced brushing activity has relatively little influence on the thoroughness of dirt removal.

Particular embodiments of the invention are set forth in the dependent claims.

Further aspects, effects and details of the invention are set forth in the detailed description below with reference to examples of which some are shown in the schematic drawings.

In this description, reference is made to the drawings wherein like parts are designated with like numerals throughout.

Figure 1:
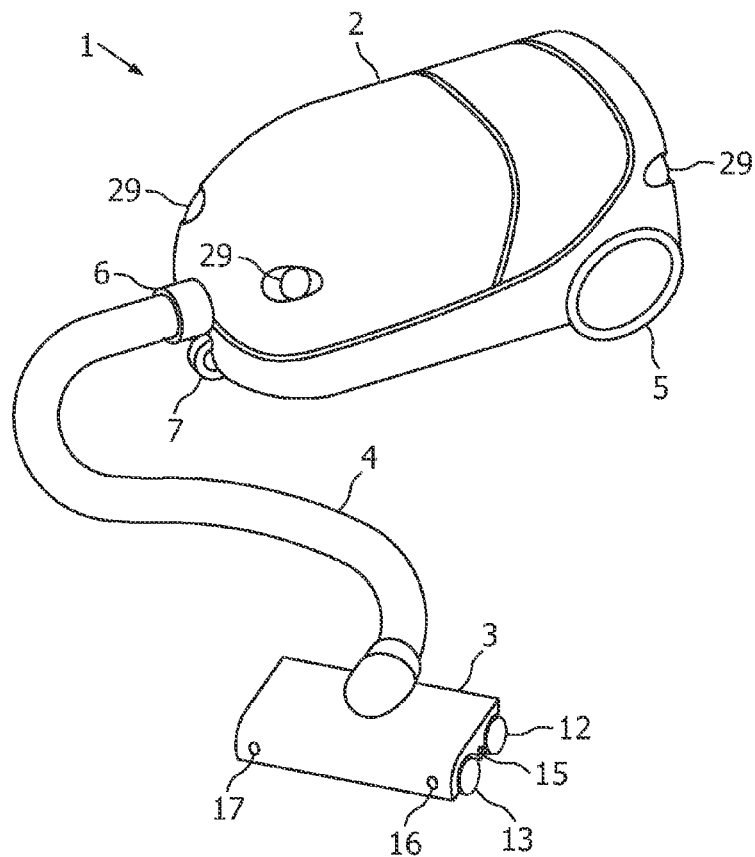
FIG. 1 is a front perspective view of an example of a robotic vacuum cleaner according to the invention.

In a preferred embodiment according to the invention, shown in FIG. 1, an autonomous vacuum cleaner 1 comprises a main body, or control platform 2 and a separate suction nozzle 3, connected with each other via a hose assembly 4. Because the suction nozzle 3 and the control platform 2 are two separated modules, the suction nozzle 3 can be of a relatively small size. The suction nozzle 3 is therefore capable of passing under most objects, such as furniture or radiators. Other embodiments of autonomous vacuum cleaners according to the invention are also possible, for example an embodiment in which the suction nozzle and the control platform are integrated into a single module, or in which the connection of the suction nozzle 3 is articulated relative to the control platform 2 via a hinge.

Figure 2:
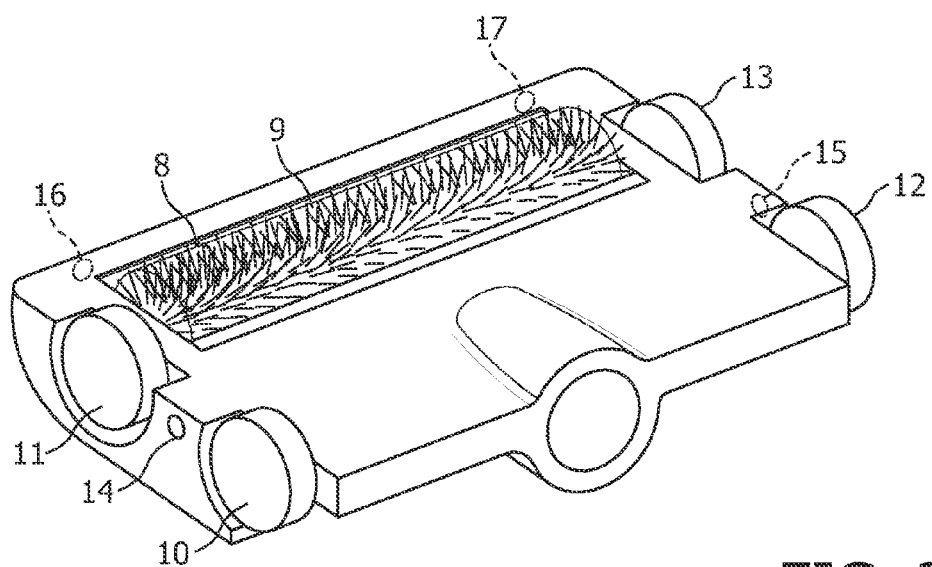
FIG. 2 is a perspective view of an underside of a suction nozzle of a vacuum cleaner according to FIG. 1.
Figure 3:
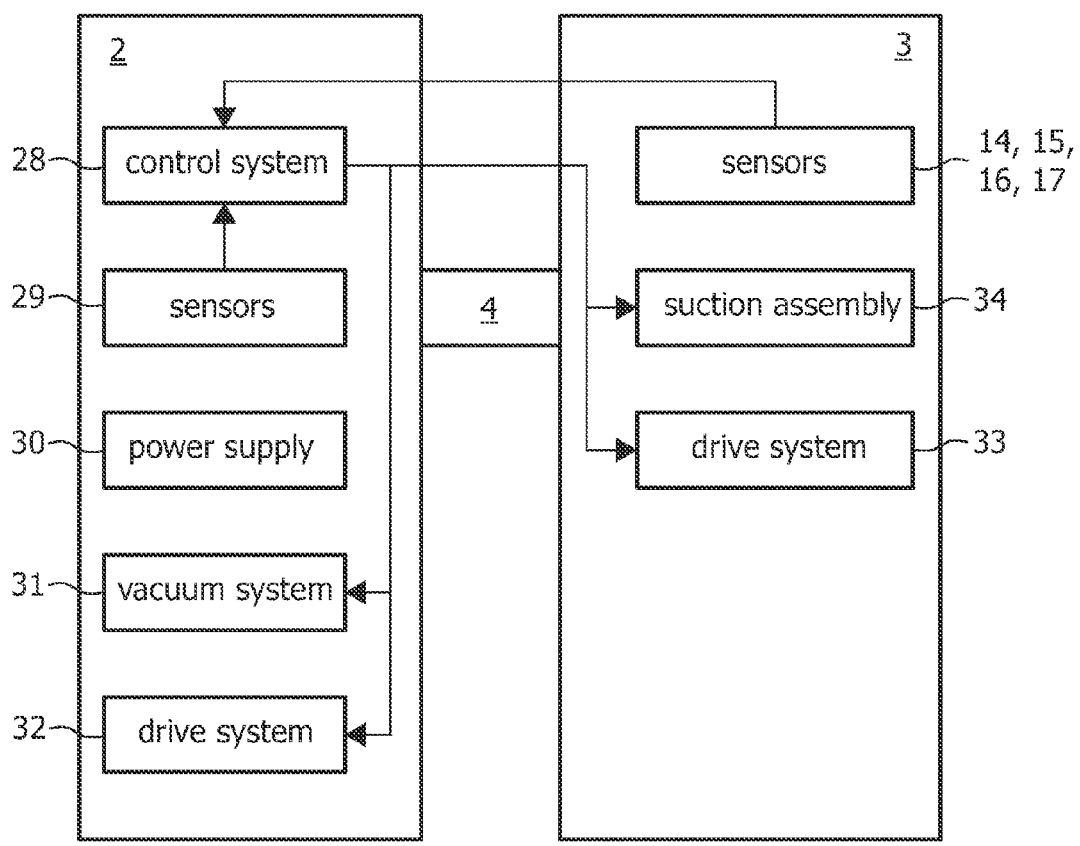
FIG. 3 is a schematic representation of selected components of the vacuum cleaner shown in FIGS. 1 and 2.

FIG. 3 shows a schematic view of a possible layout of selected components of a vacuum cleaner as shown in FIGS. 1 and 2. The flow of information between the components is indicated with arrows.

The main body 2 of the autonomous vacuum cleaner comprises a power supply 30, a vacuum system 31, a drive system 32, a control system 28, and sensors 29. In the present embodiment, the suction nozzle 3 comprises a drive system 33, a suction assembly 34 and sensors 14, 15, 16, 17.

The control system 28 includes a microprocessor, memory, interfaces and sensors 29, and is arranged for performing navigation, mapping the environment, and controlling and tracking the position of the control platform 2 and the suction nozzle 3 on the basis of information provided by the sensors 14, 15, 16, 17, 29 and memory, and one or more localization methods or algorithms. The control system 28 may also be capable of task management and the distribution of tasks, for example by way of a calendar.

The arrows in FIG. 3 show an example of a stream of information between the different parts of the autonomous vacuum cleaner. The control system 28 receives information from the sensors 29 in the control platform 2 and from the sensors 14, 15, 16, 17 in the suction nozzle 3. This information is used by the control system 28 to control the drive 32 of the control platform, the drive 33 of the suction nozzle 3, the vacuum system 31 and the suction assembly 34. This information may for example represent the distance to a boundary the suction nozzle 3 is approaching and the amount of dust picked up from the floor surface being cleaned. The control system 28 then uses the information to respectively direct the drive systems 32, 33 on a trajectory avoiding collision with the object, and to adjust the cleaning power of the vacuum system 31 and suction system 34 to the amount of dust on the floor being cleaned.

It is observed that FIG. 3 is a simplification of an embodiment according to the invention, only showing some of the parts and only indicating one of many possible information flows between these parts. The parts may also be distributed in any other suitable way between the control platform 2 and the suction nozzle 3, or in any other suitable embodiment according to the invention. In alternative embodiments it is for example possible to equip the suction nozzle 3 with part of the control system 28 in the form of a processor which could be provided with information of sensors 29 located on the control platform 2. In yet another embodiment the main part of the control system 28, for example a processors and a memory, could be located in a stationary base station, and information could be transmitted wirelessly to a secondary control system in the control platform 2 and/or suction nozzle 3.

A camera or cameras may be provided as the primary sensors 29, for example one at each corner of the control platform 2, for providing information about for example boundaries in its surroundings. Other embodiments can use sonar, radar, lidar, and infrared sensors, in addition to, or in place of the optical sensors. The control system 28 can use the sensors 29 to locate the suction nozzle 3, and to control its movements during operation. In a preferred embodiment the suction nozzle 3 is applied with sensors 14, 15, 16, 17 for providing information about boundaries in its surroundings. In addition, sensors can be used to determine the type of surface that is being cleaned, the amount of dirt present on the surface, etc.

The hose assembly 4 connects the vacuum system in the control platform 2 with the suction assembly of the suction nozzle 3 and thereby the suction nozzle 3 with the control platform 2. The hose assembly 4 may be equipped with conductors connecting parts on the control platform 2 with parts on the suction nozzle 3, for example connecting the power supply 30 with a drive system 33 for driving the suction nozzle, or connecting the sensors 14, 15, 16, 17 with the control system 28. Such conductors can run inside or outside the hose assembly, or be integrated within the wall of the hose. In another embodiment the cables can be bundled into one main cable that runs separately form the hose assembly 4 between the suction nozzle 3 and the control platform 2.

The power supply 30 of the autonomous vacuum cleaner may comprise rechargeable batteries, fuel cells, or other self-contained sources of power. The batteries may for example be recharged autonomously by the vacuum cleaner 1 connecting itself with a docking station connected with the electricity grid, or by a user connecting the vacuum cleaner via a power cord with a wall outlet. However the vacuum cleaner may also be arranged for power supply from the mains during operations.

Both control platform 2 and suction nozzle 3 are equipped with a drive system 32, 33 for moving around. Such a drive system may comprise one or more motors connected with one or more driving wheels 5, 10, 12, wheels 7, 11, 13 or for example skid plates for carrying the load of the modules, and electronics for driving the motor. Sensors, for example integrated into the drive wheel motors, may collect data such as the revolutions of wheels or driving axle to provide the control system 28 with information to aid in determining the actual motion and speed. The control platform 2 of the embodiment shown in FIG. 1 is provided with two driving wheels 5 located at the back corners (only one is shown in the Figure), and one castor located below the hose connection 6 at the front of the control platform 2. The suction nozzle 3 also comprises two driving wheels 10, 12 and two castors 11, 13. Steering of the modules may be achieved by the control system 28 rotating the two driving wheels 5, 10, 12 at a different speed, or even at a different direction, thus rotating the control platform 2 or suction nozzle 3 about a vertical axes. This way of steering is quite similar to the way a tank is steered. Other solutions are also possible, and are known in the art.

The vacuum system on the control platform 2 of the autonomous vacuum cleaner 1 comprises an electric fan for creating suction power and a bag or container for the collection of dust and debris. The airflow generated by the electric fan flows via the hose assembly 4 from a suction opening 8 of the suction assembly 34 in the suction nozzle 3 to the bag or container on the control platform 2. In addition to an electric fan the autonomous vacuum cleaners 1 is also equipped with a suction nozzle 3 comprising a power or cleaning brush 9, making it possible to achieve a thorough dust pick-up at a low power usage per square meter, and thus improving the range of the autonomous vacuum cleaner 1. A cleaning brush 9 is especially effective when vacuuming carpets and rugs. When vacuuming other surfaces such as wood or stone, the control system 28 may slow down the rotational speed of the brush 9, or even shut it down.

In a preferred embodiment according to the invention the suction assembly 34 of the suction nozzle 3 contains a motor driven cleaning brush 9, for improving dust pick-up capabilities. Besides using a separate motor for rotating the cleaning brush 9 it is for example also possible to use the airflow through the suction nozzle, to connect the brush with the drive system 33 or to use a stationary brush.

Figure 4:
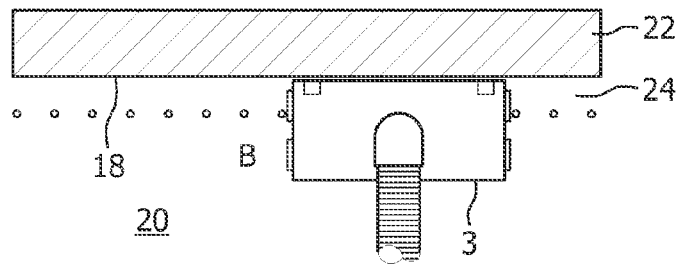
FIG. 4 is a schematic top view of the suction nozzle approaching a wall.
Figure 4:
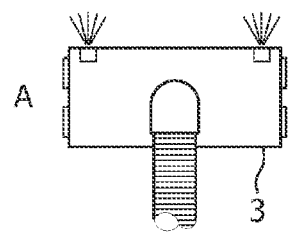
Figure 5:
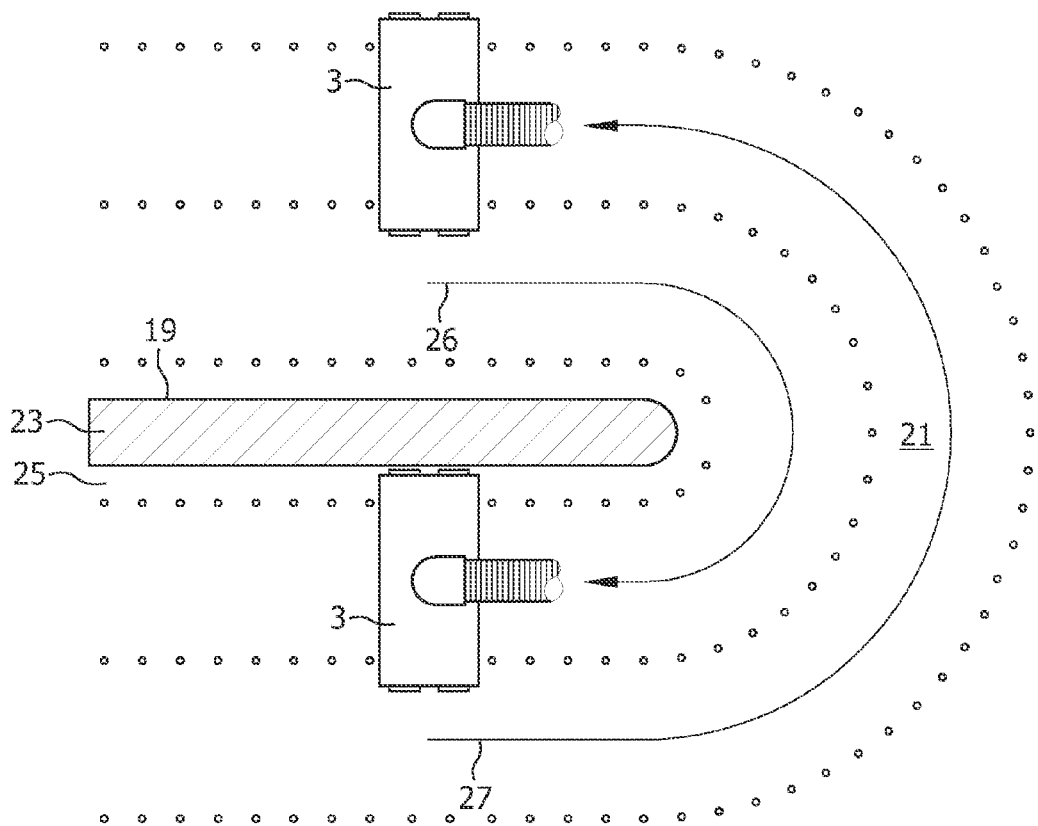
FIG. 5 is a schematic top view of the suction nozzle moving along a wall.

As best seen in FIG. 2, the cylindrical brush 9 is positioned in a suction opening 8 of the suction nozzle 3. Because of its cylindrical form, only part of the brush projects from the housing of the suction nozzle 3 so as to touch the floor when the suction nozzle 3 is in operation. As can clearly be seen in FIG. 2, the contour of the area in which the cylindrical brush can touch the floor is smaller than the footprint of the suction nozzle 3 and spaced from the contours of the footprint of the suction nozzle 3. This is advantageous to avoid spilling dust into the environment of dust that is whirled up by the brush 9. However, as is illustrated by FIGS. 4 and 5, this entails that the brush 9 cannot brush a floor surface up to a boundary 18, 19 of an area 20, 21 to be vacuum cleaned if the area is bounded by a surface of a structure 22, 23 at a level above the floor that is touched by the suction nozzle 3, such as a skirting-board or a radiator. This leaves a narrow strip 24, 25 of the area to be vacuum cleaned 20, 21 along such boundaries 18, 19 that is never brushed. Accordingly, wear due to brushing will not occur in those narrow strips 24, 25. This causes the wear that does occur in neighboring areas of the vacuum cleaned area 20, 21 to become relatively conspicuous.

Also, portions of floor surfaces 20, 21 close to boundaries such as walls, are generally not walked on as intensively as other portions of floor surfaces 20, 21, so that the wear due to robot brushing is virtually the only cause of wear in the areas close to such boundaries and accordingly more conspicuous than in other areas. Moreover, because floor surfaces 20, 21 close to the boundaries formed by structures 22, 23 projecting from the floor, such as walls, are generally not walked on as intensively as other portion of floor surfaces 20, 21, dirt in the areas close to such boundaries does not tend to be walked into carpets and the like to the same extent as in other areas and therefore there is less need for brushing to remove dirt form these areas while vacuum cleaning, even at relatively low suction power as generally applied by robotic vacuum cleaners.

When using a vacuum cleaner according to the present embodiment, the extent to which wear patterns become visually conspicuous in portions of carpets and the like closely along boundaries formed by structures above the floor is reduced particularly effectively, with no or relatively little negative impact on cleaning performance. The control system reduces the brushing intensity when the suction nozzle 3 is approaching a boundary of the area 20, 21 being vacuum cleaned formed by an obstacle. In the present embodiment, this is achieved by reducing the rotational velocity of the brush 9 as a function of the distance to the obstacle, such that the brush rotates slower when the suction nozzle is close to the obstacle 18, 19.

Wear closely along the boundaries such as the boundaries 18, 19 is reduced particularly effectively, because the brush 9 is not driven when the suction nozzle is in contact with the boundary. By providing that, at least in such a situation, the brush 9 is freely rotatable in accordance with movements of the suction nozzle 3 so as to freely roll over the floor, also wear due to movements of the suction nozzle 3 relative to the floor 20, 21 is reduced in areas where such wear tends to become relatively conspicuous.

For example, when the suction nozzle 3 approaches the obstacle 22, sensors 16, 17 signal the control system that the suction nozzle 3 is approaching an obstacle. At a predetermined distance, indicated by position A in FIG. 4, the control system starts gradually reducing the rotational speed of the brush 9 until the brush 9 is no longer driven, when the suction nozzle 3 arrives in position B, adjacent to the wall 22.

In another example, shown in FIG. 5, the track of the suction nozzle 3 runs parallel to the contour 19 of the object 23. When the suction nozzle 3 is following a track in contact with the wall 23 or very close to the wall, indicated by arrow 26, the control system controls the motor for driving the brush 9 such that the brush 9 is not driven. When the suction nozzle 3 moves along a neighboring (overlapping) track, indicated by arrow 27, the motor for driving the brush 9 is controlled for driving the brush 9 at a higher velocity, and when the suction nozzle is running in a third adjacent track, the speed of rotation of the brush can again be set higher. This procedure can be repeated until the brush 9 is driven at normal working speed, thus creating a gradual wear gradient from the boundary 19 to areas more remote from the boundary. The steepness of the gradient may be fixed, manually set or automatically be determined in accordance with the overall size of the room or in accordance with dirt pick-up data stored during earlier vacuum cleaning cycles.

In the present embodiment, the extent to which the formation of visible patterns causes wear to become relatively conspicuous is also reduced by reducing wear due to brushing towards boundaries of the vacuum cleanable floor surface 20, 21 by providing that the frequency at which a portion of the vacuum cleanable floor surface 20, 21 is brushed is lower, the closer that portion is to a boundary 18, 19 formed by an obstacle 22, 23 for the suction nozzle 3 above the floor.

In the present embodiment, this is achieved by providing that the control system includes a memory for storing a map of the vacuum cleanable floor surface and trajectories followed by the suction nozzle. The control system is arranged for conducting the suction nozzle 3 such that a first minimum distance is maintained between the boundary 18, 19 and the suction nozzle 3 during a first cleaning cycle, and a second minimum distance, different form the first minimum distance is maintained between the boundary 18, 19 and the suction nozzle 3 during a second cleaning cycle.

However, also other solutions for reducing the brushing frequency as a function of the distance to a boundary of the vacuum cleanable floor surface can be applied, such as reducing the number of repeated passages over an area during a cleaning cycle the closer the area is to the boundary, reducing the overlap between successive, preferably generally mutually parallel trajectories in an area the closer the area is to the boundary or increasing the relative frequency at which a passage along a trajectory is skipped the closer the area is to the boundary.

Preferably, the vacuum cleaner also includes a floor type sensor connected with the controller for determining the type of surface that is being cleaned and the control system is preferably arranged for controlling the frequency or the intensity of contact between the cleaning brush and the floor surface as a function of the distance to a boundary of the vacuum cleanable floor surface only in response to a signal from the floor type sensor indicating a predetermined type of floor surface or one of a predetermined group of floor surface types. This allows the reduced brushing action for reduced wear to be applied only where a floor surface is being vacuum cleaned where wear due to the brushing action tends to become visible after some time.

In the present embodiment, the sensors 16, 17 also form the floor type sensors, so that no additional sensors for sensing the floor type are necessary. To this end, the detectors 16, 17 are provided in the form of cameras. Alternatively, also other types of vision systems may be employed.

It is also possible to use the resistance encountered by the cleaning brush 9 as an indication of the floor type being cleaned.

The skilled person will understand, that within the framework of the invention as set forth in the claims, many other embodiments than those described above are conceivable; the brushing intensity may for instance be varied by varying the contact pressure between the brush and the floor, or, if the movement of the brush is driven by the air flow, the brushing intensity may for instance be varied by varying the position of the brush in the airflow. Also other configurations of vacuum cleaners are possible, for example a vacuum cleaner in which the suction nozzle and the fan module are rigidly connected or fully integrated, or a configuration comprising a third, separate module for controlling the navigation, which module may be outside the fan and/or suction nozzle module and may communicate with the fan and/or suction nozzle module by wireless communication.

The invention claimed is:
1. A robotic vacuum cleaner comprising:
   a suction nozzle with a cleaning brush arranged for contacting a floor;
   a drive and steering mechanism for providing mobility and steerability to at least the suction nozzle;
   at least one detector for determining boundaries of a vacuum cleanable floor surface; and
   a control system communicating with the at least one detector and with the drive mechanism for conducting the suction nozzle over the vacuum cleanable floor surface,
   wherein the control system is arranged for controlling at least frequency or intensity of contact between the cleaning brush and each portion of the floor surface to be brushed with at least some portions of floor surface closely adjacent to at least one of the boundaries of the vacuum cleanable floor surface, at least the frequency or the intensity of contact between the cleaning brush and each of the floor surface portions decreases as approaching the at least one boundary of the vacuum cleanable floor surface.

2. The vacuum cleaner according to claim 1, wherein the control system is arranged for automatically reducing the intensity of contact between the cleaning brush and the floor surface in response to a distance to the at least one boundary of the vacuum cleanable floor surface below at least one predetermined value.

3. The vacuum cleaner according to claim 2, wherein the cleaning brush is drivable for motion within the suction nozzle and wherein the control system is arranged for controlling the velocity of rotation of the cleaning brush for reducing the velocity of rotation in response to the distance to the at least one boundary of the vacuum cleanable floor surface being below the at least one predetermined value.

4. The vacuum cleaner according to claim 3, wherein the control system is arranged for controlling a motor for ceasing driving of the cleaning brush in response to the distance to the at least one boundary of the vacuum cleanable floor surface being below the at least one predetermined value.

5. The vacuum cleaner according to claim 2, wherein the cleaning brush is suspended for contacting the floor surface with a controllable downward contact force and wherein the control system is arranged for causing the downward force to be reduced in response to the distance to the at least one boundary of the vacuum cleanable floor surface being below the at least one predetermined value.

6. The vacuum cleaner according to claim 1, wherein the suction nozzle has a footprint with a footprint contour and wherein the cleaning brush is shaped and suspended for brushing in a brushing area having a brushing area contour, the brushing area contour being located within and spaced from the footprint contour.

7. The vacuum cleaner according to claim 1, wherein the control system is arranged for gradually reducing the intensity of contact between the cleaning brush and the floor surface a plurality of times as approaching the at least one boundary of the vacuum cleanable floor surface.

8. The vacuum cleaner according to claim 1, further comprising a floor type sensor connected with the controller for determining the type of surface that is being cleaned and wherein the control system is arranged for the controlling of at least the frequency or the intensity of contact between the cleaning brush and the floor surface, such that at least, at least for portions of floor surface closely adjacent to at least one of the boundaries of the vacuum cleanable floor surface, the frequency or the intensity of contact between the cleaning brush and the floor surface decreases with the distance to the at least one boundary of the vacuum cleanable floor surface, only in response to a signal from the floor type sensor indicating a predetermined type of floor surface or one of a predetermined group of floor types.

9. The vacuum cleaner according to claim 8, wherein the at least one detector for determining boundaries of a vacuum cleanable floor surface also is the floor type sensor.

10. The vacuum cleaner according to claim 1, wherein the at least one detector for determining boundaries of a vacuum cleanable floor surface is a vision system.

11. A vacuum cleaner according to claim 1, wherein the control system includes a memory for storing a map of the vacuum cleanable floor surface and trajectories followed by the suction nozzle, the control system being arranged for conducting the suction nozzle such that:
during each cleaning cycle, the suction nozzle is moved along a plurality of successive suction nozzle trajectories covering the vacuum cleanable floor surface;
a first minimum distance is maintained between the at least one boundary and the suction nozzle during a first cleaning cycle, and
a second minimum distance different from said first minimum distance is maintained between the at least one boundary and the suction nozzle during a second cleaning cycle.

12. A method for robotic vacuum cleaning a floor surface, the method comprising acts of:
passing a suction nozzle with a cleaning brush contacting the floor surface over the floor surface to be cleaned, under control of a control system communicating with at least one detector for determining at least one boundary of the floor surface to be cleaned,
wherein the control system controls at least frequency or intensity of contact between the cleaning brush and each portion of the floor surface being brushed, such that, at least for some portions of floor surface closely adjacent to at least one of the boundaries of the vacuum cleanable floor surface, at least the frequency or the intensity of contact between the cleaning brush and each of the floor surface portions decreases as approaching the at least one boundary of the vacuum cleanable floor surface.

\* \* \* \* \*